(12) United States Patent
Patnaikuni et al.

(10) Patent No.: US 11,614,715 B2
(45) Date of Patent: Mar. 28, 2023

(54) MAGNETICALLY ORBITING USER-WORN DEVICE

(71) Applicant: International Business Machines Corporation, Armonk, NY (US)

(72) Inventors: Subha Kiran Patnaikuni, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 16/815,337

(22) Filed: Mar. 11, 2020

(65) Prior Publication Data

US 2021/0286321 A1    Sep. 16, 2021

(51) Int. Cl.
*G04B 37/14* (2006.01)
*H02N 15/00* (2006.01)

(52) U.S. Cl.
CPC ..... *G04B 37/1486* (2013.01); *G04B 37/1426* (2013.01); *H02N 15/00* (2013.01)

(58) Field of Classification Search
CPC ............ G04B 37/1486; G04B 37/1426; H02N 15/00; G04C 3/004
See application file for complete search history.

(56) References Cited

U.S. PATENT DOCUMENTS

| 8,870,448 B2 * | 10/2014 | Bianco | A44C 5/00 |
| | | | 224/174 |
| 11,042,121 B2 * | 6/2021 | Bozovic | G04C 17/00 |
| 2010/0056222 A1 | 3/2010 | Choi et al. | |
| 2012/0147713 A1 * | 6/2012 | Vouillamoz | G04C 17/00 |
| | | | 116/284 |
| 2015/0077438 A1 * | 3/2015 | Tamaki | G06F 3/0485 |
| | | | 345/672 |
| 2016/0125846 A1 | 5/2016 | Xu et al. | |
| 2017/0150616 A1 * | 5/2017 | Li | H05K 5/0217 |
| 2017/0220123 A1 * | 8/2017 | Fuchikami | G06F 1/1694 |
| 2017/0278436 A1 | 9/2017 | Chu | |
| 2018/0232120 A1 | 8/2018 | Son et al. | |
| 2018/0376603 A1 | 12/2018 | Lee et al. | |
| 2019/0220166 A1 | 7/2019 | Nagaraju et al. | |

(Continued)

FOREIGN PATENT DOCUMENTS

DE    102015104767 B4    10/2019
WO      2018204811 A1    11/2018

OTHER PUBLICATIONS

Samsung, "Avoid skin irritation from your Samsung smartwatch," Samsung, Printed Jan. 28, 2010, 3 pages, https://www.samsung.com/us/support/troubleshooting/TSG01108928/.

(Continued)

*Primary Examiner* — Edwin A. Leon
*Assistant Examiner* — Kevin Andrew Johnston
(74) *Attorney, Agent, or Firm* — Peter J. Edwards

(57) ABSTRACT

A user-worn device includes a band portion and a display portion. The band portion comprises a wire that is configured to create a first magnetic field that follows the curvature of the band portion. The display portion comprises a first electromagnet that is configured to produce a second magnetic field. The display portion orbits around the band portion in a first orbital direction when the first and second magnetic fields interact.

19 Claims, 8 Drawing Sheets

(56) References Cited

U.S. PATENT DOCUMENTS

2019/0282166 A1* 9/2019 VanBlon .............. A61B 5/6843
2021/0022258 A1 1/2021 Yu

OTHER PUBLICATIONS

Myers, "This Is What Your Smartwatch Is Doing to Your Sad, Chafed Wrist Skin," Mel Beta, Printed Jan. 28, 2020, 2 pages, https://melmagazine.com/en-us/story/apple-watch-smartwatch-rash-itch-bump-red-spots.

Shukla, "Samsung Galaxy Watch Owners Complaining About Rashes, Burns, Skin Reactions," Value Walk, Oct. 15, 2018, 6 pages, https://www.valuewalk.com/2018/10/samsung-galaxy-watch-skin-rashes/.

Kim, "Wearables still haven't solved the problems of skin science, but new ideas are coming," Wearable, Health and Wellbeing Wearable Technology Feature, Nov. 18, 2017, 3 pages, nttps://www.wareable.com/health-and-wellbeing/skin-science-complex-wearables-4441.

Gartenberg, "Apple patents self-adjusting Apple Watch bands," The Verge, Oct. 10, 2017, 2 pages, https://www.theverge.com/2017/10/10/16452402/apple-patent-watch-band-automatic-adjustment-biometri.

Torres, "This smartwatch prototype moves in five different ways," Slash Gear, May 9, 2017, 7 pages, https://www.slashgear.com/this-smartwatch-prototype-moves-in-five-different-ways-09484425/.

Patnaikuni et al., "User-Worn Device With Extendable Display", U.S. Appl. No. 16/815,406, filed Mar. 11, 2020.

List of IBM Patents or Patent Applications Treated as Related, dated Mar. 10, 2020, 2 pages.

"Rollable display," Wikipedia, Edited Jul. 31, 2019, 3 pages, https://en.wikipedia.org/wiki/Rollable_display.

Purcher, "Samsung Chalks Up Another Granted Patent for a Next-Gen Scrollable Device using Infinity Flex Displays," Patently Mobile, Jan. 30, 2019, 5 pages, https://www.patentlymobile.com/2019/01/samsung-chalks-up-another-granted-patent-for-a-next-gen-scrollable-device-using-infinity-flex-displays.html.

Niu, "BTP: A Bedtime Predicting Algorithm via Smartphone Screen Status," Hindawi: Wireless communications and Mobile Computing, vol. 2018, Oct. 22, 2018, 11 pages, available at: http://downloads.hindawi.com/journals/wcmc/2018/7619102.pdf.

McMillan et al., "Situatiing Wearables: Smartwatch Use in Context," ACM Conference on Human Factors in Computing Systems (CHI), May 6-11, 2017, 13 pages, available at: http://airilampinen.fi/files/p3582-mcmillan.pdf.

De Arriba-Perez et al., "Collection and Processing of Data from Wrist Wearable Devices in Heterogeneous and Multiple-User Scenarios," Sensors (Basel), vol. 16:9 1538, Sep. 21, 2016, 31 pages, available at: https://www.ncbi.nlm.nih.gov/pmc/articles/PMC5038811/pdf/sensors-16-01538.pdf.

Porter, "Nubia's New Wearable Puts a 4-Inch Flexible Smartphone on your Wrist," The Verge, Feb. 25, 2019, 7 pages, https://www.theverge.com/circuitbreaker/2019/2/25/18240370/nubia-alpha-release-date-price-features-wearable-smartwatch-flexible-display-mwc-2019.

* cited by examiner

MAGNETICALLY ORBITING USER-WORN DEVICE

BACKGROUND

The present disclosure relates to user-worn devices, and more specifically, to positional wrist-worn devices.

Typical user-worn devices are secured to a user's limb with a band. For example, typical wrist-worn devices utilize a wristband that cause the device to remain in place when the wristband is wrapped tightly around a user's wrist. Some wristband can be tightened or loosened with or without user intervention.

When a user attempts to view the display portion of a user-worn device that is worn upon the user's wrist, the user sometimes raises his or her wrist to bring a display portion of the device into view. However, if the wristband is not sufficiently tight, the user-worn device may rotate around the user's wrist, which may cause the display portion to exit the user's view.

SUMMARY

Some embodiments of the present disclosure can be illustrated as a user-worn device comprising a band portion. The band portion comprises a wire that is configured to create a first magnetic field. The first magnetic field follows the curvature of the band portion. The user-worn device also comprises a display portion. The display portion comprises a first electromagnet that is configured to produce a second magnetic field. The display portion orbits around the band portion in a first orbital direction when the first and second magnetic fields interact.

Some embodiments of the present disclosure can also be illustrated as a method comprising monitoring the usage data of a user-worn device. The method may also comprise predicting that a user of the user-worn device is attempting to utilize a display portion of the user-worn device. The method may also comprise determining a desired location of the display portion based on the monitoring and the predicting. The method may also comprise determining an efficient orbital direction based on the monitoring and the desired location. The method may also comprise tightening a device band of the user-worn device. The method may also comprise orbiting the display portion to the desired location in the orbital direction.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
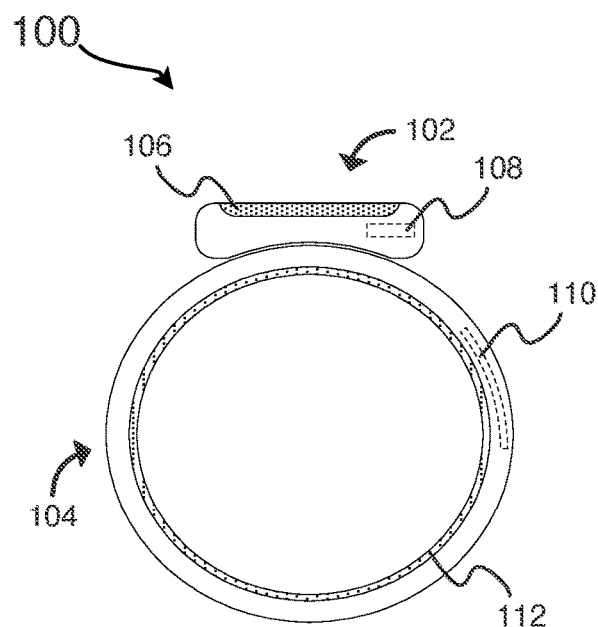
FIG. 1A depicts a wrist-worn device with a display portion in a first position.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to user-worn device, and more specifically, to positional wrist-worn device. While the present disclosure is not necessarily limited to such applications, various aspects of the disclosure may be appreciated through a discussion of various examples using this context.

User-worn devices may be worn by users for various purposes, such as telling time, recording and viewing biometric information, reading incoming notifications communications (e.g., calendar alerts and text messages), controlling other electronic peripherals, and others. These user-worn devices are sometimes secured to a user's arm by an armband (sometimes referred to herein as a "wristband" "device wristband," "device band," a "band" or a "belt" depending on the circumstances) that may both prevent the user-worn device from falling off the user's arm and prevent the user-worn device from shifting out of place.

However, some users experience discomfort when their skin is in constant contact with device bands. This discomfort may be exacerbated when a wristband is worn tightly against the user's wrist. For this reason, some users may prefer to wear their wrist-worn devices with the wristbands only tight enough to prevent the wrist-worn device from falling off the user completely, but not tight enough to prevent movement of the device. Thus, the wrist-worn devices of these users may shift up and down the user's arm and rotate around the users arm or wrist during typical use.

However, some user-worn devices are less useful when worn in loose configurations. For example, many user-worn devices have a display portion that displays data to the user wearing the device. Wristwatches and some heart-rate monitors are examples of such user-worn devices. When such a device is worn in a loose configuration, the user-worn device may, for example, rotate on the user's wrist, causing the display portion of the wrist-worn device to face away from the user or become obstructed from view. In these situations, the user is unable to see the data displayed by the wrist-worn device (for example, the current time), making the wrist-worn devices less useful.

Further, some uses of a user-worn device require that the user-worn device be secured tightly to the user's skin regardless of the device's orientation. For example, using a user-worn device to record user biometric information (e.g., heartrate, blood pressure) often requires a sensor on the user-worn device be in constant contact with the user's skin. Further, in some instances, shifting to different portions of a user's skin (e.g., sliding up and down a user's arm), even when constant skin-contact is maintained, may cause biometric measurements to be inaccurate.

Some user-worn devices feature bands that may be worn loosely when the user is not actively using the device, but that may tighten (manually or automatically) when a loose band may be detrimental. For example, a smart watch may maintain a loose configuration when the device is on standby, but the band may tighten when the smart watch detects that the user is attempting to check the time or record his or her heart rate. There are several different designs by which the band may tighten. For example, in some such user-worn devices, the inner layer of a device band (i.e., the layer near the user's skin) may inflate, causing the band to constrict around the space between the band (i.e., the space partially occupied by the user's arm or wrist). In other designs, a user-worn device band may cinch tighter (for example, by using a ratcheting system). Once the user-worn device tightens on the user's skin, the user-worn device may, for example, be used to collect biometric information or display the time to the user, provided that the user-worn device tightened in the correct location and orientation.

Unfortunately, in many instances the user-worn device may not tighten in the correct location or orientation, causing the tightening feature to be less beneficial (and potentially even more detrimental). For example, a user wearing an automatically tightening smart watch may raise his or her hand to view a calendar notification. When the smart watch detects that the user is attempting to view the display, the smart watch may automatically tighten on the user's wrist, preventing shifting of the display portion. However, if the display portion is facing away from the user's face when the smart watch tightens, the user may be unable to view the display portion of the watch. Further, because the band may now be tight, the user may be unable to rotate the watch to position the display portion where the user is able to view it.

Some user-worn devices feature display portions that are able to orbit around the user-worn-device band. For example, some watches feature a mechanical rail with which a rotating gear may interface. The gear may be connected to a spinning motor, which may rotate the gear and cause it to push against a set of teeth within the mechanical rail, moving the display portion around the rail. This may enable the display portion to orbit around the user's wrist until it is in a position to perform biometric measurements or be viewed by the user.

However, the components necessary to enable a display portion to orbit around a user's arm (or especially a user's wrist) using mechanical means may make these designs detrimental for many use cases. For example, a mechanical rail, mechanical motor, and gears between them may add a sufficient amount of bulk to the user-worn device. Further, mechanical locomotion mechanisms may use a significant amount of energy compared to other solutions, which may, in some use cases, limit the ability of the user-worn device to perform its key function (e.g., measuring the user's heartrate). In other cases, the added energy use may cause also cause the user-worn device to shut down earlier than the device may otherwise shut down. For these and other reasons, a user-worn device that can orbit around a device band without relying upon mechanical locomotion would be beneficial.

Some embodiments of the present disclosure address these and other issues by utilizing a magnetic method of orbiting a display portion around a device band. In some such embodiments, the magnetic components in the device band, display portion, or both may add minimal bulk to the overall user-worn device, and may use significantly less power than a mechanical system of orbiting the display portion around the device band.

For example, some embodiments of the present disclosure may create a magnetic field around the device band (sometimes referred to herein as a "band magnetic field"). A display portion of the user-worn device may interact with this magnetic field, causing the display portion to orbit around, for example, the wrist of the user. For example, a display portion may include a electromagnet (e.g., a solenoid) that may be configurable between a charged state and an uncharged state. When the electromagnet is charged (for example, when the solenoid receives current from a battery in the display portion), the electromagnet may also create a magnetic field (sometimes referred to herein as a "solenoid magnetic field." The interaction of the solenoid magnetic field with the band magnetic field may result in a force being applied to the electromagnet (and thus the display portion) in a direction parallel to the band magnetic field. If the device band is anchored (e.g., tight around a user's wrist) and the display portion is not anchored (e.g., able to move along a track on the band), this force may cause the electromagnet (and thus the display portion) to move along the device band. If the device band is wrapped around the user's arm or wrist, this movement would cause the display portion to orbit around the user's arm or wrist, allowing it to be positioned in a convenient location to be viewed by a user or to collect biometric measurements.

These embodiments of the present disclosure may enable a user to wear a user-worn device loosely enough that the user does not experience skin irritation, but may mitigate the negative effects on device function that wearing a user-worn devices sometimes causes (negative effects such as inability to see a watch face or inability for a biometric monitor to record biometric information from an intended position). Further, by utilizing magnetic force rather than mechanical force for movement (from a mechanical motor, gears, and a toothed rail, for example), these embodiments may also prevent unnecessary power drain and bulk.

In fact, some embodiments of the present disclosure may rely on a solenoid magnetic field and band magnetic field to attract the display portion to the device band (i.e., to prevent the device portion from falling off the user-worn device). This may not only enable the user-worn device to be slimmer than a user-worn device that mechanically attaches a device portion to a device band, but it may enable faster, more-power-efficient orbital motion of the device portion.

However, relying solely on a charged electromagnet to prevent a display portion from separating from a device band may have negative consequences in some instances. For example, if such a electromagnet receives power from a battery on the device (e.g., in the device portion), the device portion may no longer be attracted to the device band when the battery's charge is depleted. In those instances, the device portion may be easier to dislodge as the battery's charge becomes low, and may simply fall off the device band when the battery becomes empty.

Thus, some embodiments of the present disclosure include a permanent (or semi-permanent) structural connection between a display portion and a band portion that does not rely on current flowing through the electromagnet. For example, in some embodiments the exterior of a device band may feature a physical rail that a component on the device portion may anchor to. This rail may, for example, include a head portion, web portion, and foot portion, and may appear similar to a rail used in locomotive railways. A display portion may include a set of wheels or other mechanism designed to interface with the rail, similar to the mechanism by which some monorail trains interface with monorail rails. In such embodiments, the display portion may be capable of moving along the rail when magnetic force is applied to the display portion, but may remain anchored to the device band when the device battery is depleted.

However, in some use cases a physical rail may also have negative consequences. For example, in order to provide sufficient structural connection, a rail on a device band may need to be large enough that it adds to the bulk to the user-worn device or otherwise makes the user-worn device cumbersome to wear. Further, the rail may increase the likelihood that the device band interacts with the user's environment in an undesirable way (e.g., snagging on the user's clothing, scratching the user's exposed skin, damaging the user's furniture). The physical rail may also decrease the flexibility of the device band, which may make the device less comfortable to wear and may decrease the device's ability to loosen and tighten to the desired sizes. Finally, the physical rail may increase the resistance against the orbital movement of the device portion (particularly if the rail is dirty). This may in turn increase the magnetic force required to push the device portion, requiring more battery power to cause the device portion to orbit the device band.

Thus, some embodiments of the present disclosure create a permanent (or semi-permanent) structural connection between a display portion and a band portion that neither relies on current flowing through a electromagnet nor on a physical rail on the exterior of the band portion. In some embodiments, for example, one or both of the device band and the display portion may include a permanent magnet (e.g., a ferromagnet or rare earth magnet) that causes a magnetic attraction between the device band and the display portion even in the absence of electrical current. In some embodiments, for example, a smart watch device may include a ring of a ferromagnet embedded in the watch band that attracts a stainless steel housing of the watch-display portion. In some embodiments, a rare earth magnet may be located in the display portion of a user-worn device and steel inserts (e.g., rods, ball bearings, steel powder) may be embedded in the device band.

In some embodiments, a permanent magnet embedded in one of the display portion or the device band may contribute to the magnetic force that causes the display portion to orbit around a device band. For example, a device band may have a ferromagnetic ring in the device band, or several ferromagnets embedded within the device band may, in the aggregate, form an approximate ring. This ferromagnetic ring or these ferromagnets may attract a steel component in the display portion of the user-worn device. Similarly, an electromagnet within the display portion may be shaped and oriented such that the electromagnet, when charged, causes a magnetic field that interacts with the magnetic field of the ferromagnet(s), causing the display portion to orbit. In another example, a display portion of a wrist-worn device may contain a ferromagnet and a device band of the wrist-worn device may contain periodic electromagnets (e.g., solenoid coils). In this example, the display portion could be moved along the band by activating one or more of the electromagnets within the band to interact with the ferromagnet. The direction of the movement may be changed by, for example, charging an electromagnet on a specific side of the ferromagnet in the display portion. For example, to cause the display portion to orbit in a clockwise direction, an electromagnet that is positioned counterclockwise with respect to the display portion may be charged. However, to cause the display portion to orbit in a counterclockwise direction, an electromagnet that is positioned clockwise with respect to the display portion may be charged.

In some embodiments that do not include a physical rail along which the display portion may orbit, the interface between the display portion and device band may be designed so as to limit friction when the display portion orbits. For example, one of or both of the device band and the display portion could be coated in a low-friction material, such as polytetrafluoroethylene. The display portion may also include ball bearings or bushings to roll freely against the device band. In some such embodiments, the ball bearings or bushings may contain a material (e.g., steel) that is attracted to a permanent magnet in the device band. This may not only increase the ability of the display portion to orbit around the user's arm or wrist, but also increase the semi-permanent structural connection between the display portion and the device band.

However, in some instances a permanent magnet constantly holding a display portion to a device band may reduce the ability of the display portion to orbit around the device band. For example, in some designs the magnetic materials in the display portion may be attracted to a permanent magnet in the device band in a direction that is opposite of an intended orbital direction. In other words, for example, a solenoid in the display portion may cause the display portion to orbit in a clockwise direction when powered, but a permanent magnet in the band may attract a stainless steel component in the display portion in a counterclockwise direction. In this example, a higher amount of current may be necessary to orbit the display portion than would otherwise be necessary in the absence of a permanent magnet. Thus, in this example, orbiting the display portion may cause a battery in the device to become depleted faster.

Thus, some embodiments of the present disclosure may enable a display portion and a device band of a user-worn device to create a permanent (or semi-permanent) structural connection only in specific locations on the device band. For example, a device band may include a permanent magnet embedded therein that attracts a magnetic material in a display portion (e.g., a stainless-steel housing of the display portion). This permanent magnet may create a connection between the display portion and band that is sufficient to prevent the display portion from falling off of the band when the display portion is positioned near the permanent magnet. However, when the display portion orbits away from the permanent magnet, the permanent magnet may not interact strongly with the display portion, which may prevent the permanent magnet from interfering with the movement of the display portion. In some embodiments, the display portion may return to a position near the permanent magnet when the user does not require the display portion be located elsewhere (for example, when the user is not viewing the display portion). In some embodiments, the display portion may orbit to a position near the permanent magnet when the user-worn device's battery charge becomes depleted below a threshold level. In these circumstances, the user-worn device may prevent the display portion from orbiting away from the permanent magnet until the battery is charged above the threshold. This may prevent the display portion from being dislodged when it the battery is completely drained.

Some embodiments of the present disclosure may also utilize an extendable display portion of a user-worn device. For example, a display portion may be composed of two separate housings that are capable of orbiting separately. In some embodiments, a rollable display may be concealed within one or both of these separate housings when the housings are adjacent to each other. However, one or more of the separate housings orbiting away from the other may cause the rollable display to unroll and exit the housings, spanning the distance between these two housings. In some embodiments, this rollable display may enable a section of a display portion of the user-worn device to discontinue orbiting early (for example, before it would be conveniently within the view of a user) because the rollable display may be located in the position in which the section of the display portion would have orbited to. In some instances, allowing one of the separate housings to discontinue orbiting earlier than what would otherwise be possible may decrease the battery power required to orbit the display portion to a desired location.

In some embodiments of the present disclosure, a machine-learning system may be utilized to identify usage habits of one or more users of a user-worn device and associate those usage habits with a likelihood of requiring a display portion of the user-worn device to be in a particular position. These associations may then be used to predict when a display portion would need to orbit around the device band. For example, a machine-learning system may associate a particular wrist movement at a particular time of day with a high likelihood that a user will look at a wrist-worn device to check the time. With that association, a wrist-worn device may attempt to identify that particular wrist movement at that particular time. When the wrist-worn device does identify the wrist movement, it may predict that the user is likely to look at the wrist-worn device, and may determine a location to which the display portion should be orbited. This ability to predict a need to orbit based on historical data may enable the display portion to begin to orbit around the user's wrist more quickly, which may also enable the display portion to reach the desired location faster. As a result, the user may be waiting or the display portion a shorter amount of time, which may be beneficial.

Figure 1B:
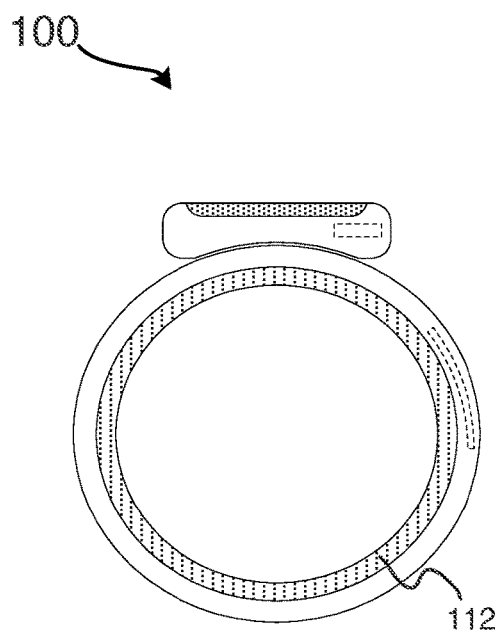
FIG. 1B depicts the wrist-worn device after tightening a wristband with the display portion in the first position.
Figure 1C:
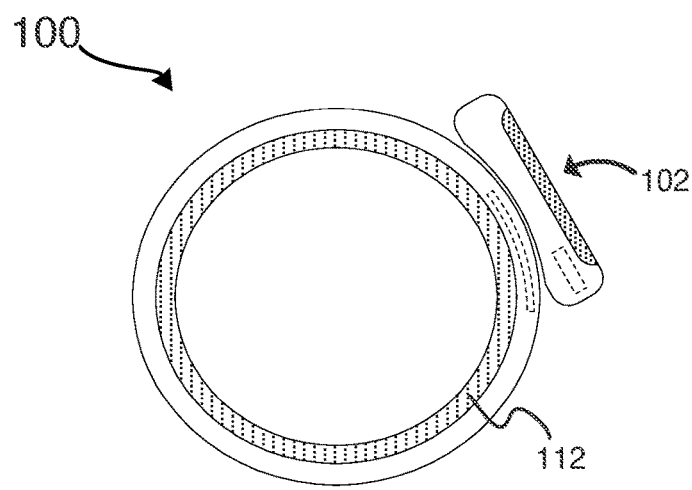
FIG. 1C depicts the wrist-worn device after tightening a wristband and after the display portion has orbited to a second position.

FIGS. 1A-1C illustrate an example wrist-worn device 100 with a display portion 102 that orbits around a device wristband 104, in accordance with embodiments of the present disclosure. Wrist-worn device 100 is illustrated as including a display 106 on display portion 102, but in some embodiments display portion 102 may take the form of a device without a display, such as a heart-rate monitor or pedometer.

Wrist-worn device 100 is also illustrated as including two batteries, display-portion battery 108 and wristband battery 110. These batteries are illustrated with dotted lines to indicate that they are located within the housing of wrist-worn device 100. In some embodiments, display-portion battery 108 may provide current to power display 106, any computation that takes place within display portion 102, and, where applicable, electromagnets within display portion 102 that provide a magnetic field necessary to cause display portion 102 to orbit around wristband 104. Wristband battery 110, on the other hand, may provide current to power the creation and operation of a magnetic field that may also be necessary to cause display portion 102 to orbit around wristband 104. Wristband battery 110 may also power tightening mechanism 112, which may cause wrist-worn device 100 to tighten around a user's wrist when wrist-worn device detects that display portion 102 should orbit around wristband 104.

While wrist-worn device 100 is illustrated as including two separate batteries, in come embodiments of the present disclosure a wrist-worn device may include only one battery. This battery may be either in a device portion or wristband. In these embodiments, current could be passed from one component (e.g., the display portion) to the other component (e.g., the wristband) in order to power all components of the wrist-worn device. For example, a wristband may include a contact strip on the exterior of the wristband through which current could be passed between a battery in a display portion to a capacitor in the wristband.

Batteries 108 and 110 may serve a variety of purposes, depending on the embodiment. For example, in some embodiments display-portion battery may provide power to display 106, and some computational activities of display portion 102, but may not provide power to a solenoid located within display portion 102. Rather, wristband battery 110 may provide power to a magnetic field surrounding wristband 104 and to one or more electromagnets within display portion 102.

In FIG. 1A, wrist-worn device 100 is shown in a standby state. In this state, tightening mechanism 112 is not engaged and display portion 102 may not be positioned to be viewed by a user or otherwise interacted with. Rather, the configuration of wrist-worn device 100 in FIG. 1A may be used when, for example, a user is watching TV or sleeping. However, if wrist-worn device 100 determines (for example, by utilizing a machine-learning system) that the user is attempting to view display 106, wrist-worn device 100 may begin to change configuration to allow display portion 102 to orbit to a desired position for viewing.

FIG. 1B illustrates wrist-worn device 100 in a second configuration. In this second configuration, tightening mechanism 112 has expanded, which may cause wrist-worn device 100 to fit tightly on a user's wrist. This may prevent wrist-worn device 100 from rotating on a user's wrist while display portion 102 is orbiting to a desired location. In some instances, this may also enable wrist-worn device 100 to record a user's biometric information more accurately.

FIG. 1C illustrates wrist-worn device 100 in a third configuration. In this third configuration, display portion 102 has orbited away from the standby position illustrated in FIGS. 1A and 1B. In this new position, a user may be able to conveniently view display portion 102. Further, because tightening mechanism 112 is expanded, wrist-worn device 100 may be tight enough on the user's wrist to prevent wrist-worn device 100 from rotating on the user's wrist. This may, in turn, keep display portion 102 in the intended position.

Display portion 102 is illustrated in FIGS. 1A-1C as being slightly physically separated from wristband 104. While this is theoretically possible in practice, the two components are illustrated as separated for the sake of emphasizing that some embodiments of the present disclosure may not rely upon a permanent physical connection between display portion 102 and wristband 104. As discussed above, in some embodiments the interaction between magnetic fields produced by components in display portion 102 and wristband 104 may keep the display portion 102 from falling off wristband 104.

Figure 2:
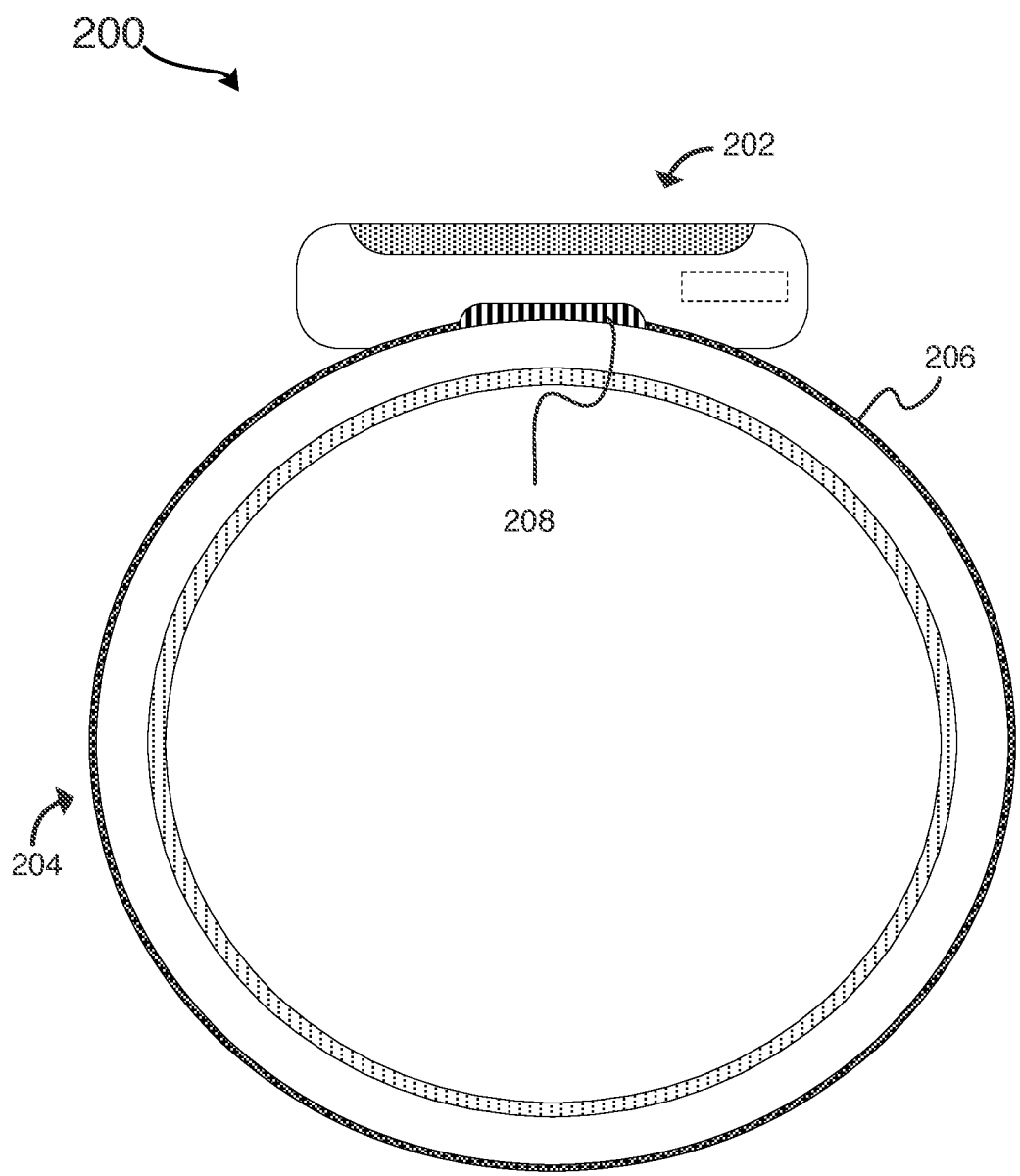
FIG. 2 depicts a wrist-worn device with an external rail that may be used to secure a display portion to a device wristband.

However, as is also previously discussed, in some embodiments a permanent structural connection between a display portion and wristband of a wrist-worn device may be beneficial. Such an embodiment is illustrated in FIG. 2. FIG. 2 illustrates a wrist-worn device 200 with a display portion 202 and wristband 204. Wrist-worn device 200 also illustrates connection rail 206 located on the exterior of wristband 204. Connection rail 206 may interact with connection component 208, located on the underside of display portion 202. This interaction may prevent display portion 202 from falling off or being dislodged from wristband 204 while still allowing display portion 202 to orbit around wristband 204.

For example, in some embodiments connection rail 206 may take the form of a rail that physically secures display portion 202. For example, connection rail 206 may include a head portion, a web portion, and a foot portion, similar to the rails on a typical railroad track. Connection component 208 may, in this example, include a set of wheels or bearings that may span the distance of the web portion between the head portion and the foot portion on either side of the rail. This may prevent display portion 202 from separating from wristband 204.

The form of connection rail 206 and connection component 208 in FIG. 2 are presented for the sake of understanding. In other embodiments of the present disclosure, other connection-rail and connection-component designs may be beneficial. For example, while connection rail 206 is shown to be an external (i.e., it is illustrated on the outside of wristband 204) in some embodiments of the present disclosure some connections rails may be partially embedded within the wristband. For example, a connection rail may be placed within a cutout of the surface of a wristband, causing the top of the connection rail to be flush with or below the outer surface of the wristband. In some of these embodiments, the connection rail and connection component may interact in the same way as suggested above (i.e., the connection rail may include a head portion, foot portion, and web portion, and the connection component may rest between the head portion and foot portion).

In other embodiments of the present disclosure, a connection rail may be completely embedded within a wristband. In those embodiments, the connection rail may create a magnetic connection with a component of the display portion. For example, in some embodiments a connection rail may take the form of a permanent magnet that attracts a magnetic material (e.g., steel) within the display portion. In some of these embodiments, the connection rail may also be shaped and oriented to create a magnetic field that circles the wristband and with which an electromagnet within the display portion may interact, causing the display portion to orbit the wristband. In some other examples, the connection rail may itself be a magnetic metal (such as steel) and the connection component may take the form of a permanent magnet that attracts connection rail, which may help to prevent the separation of a display portion from the wristband. In some of these examples, the connection rail may also be charged (consistently or configurably) to create a magnetic field that may be used to cause the display portion to orbit around the wristband.

In some use cases, however, it may not be beneficial to include a connection rail through the entire wristband that is substantial enough to provide for a structural connection in the absence of battery power. For example, such a connection rail may increase the stiffness and decrease the comfort of the wristband. In some embodiments, it may be desirable for a wristband to be more flexible and comfortable rather than provide for permanent connection throughout the entire length of the wristband.

For that reason, some embodiments of the present disclosure may be designed to only provide permanent (or semi-permanent) attachment at particular locations around the wristband. In some of these embodiments, the wristband may still create a magnetic field throughout the entire length of the wristband that is strong enough to keep a display portion from simply falling off and strong enough to cause a display portion to orbit around the wristband. However, in some embodiments the magnetic field that spans the length of the wristband may rely on a battery of the wrist-worn device or may be too weak to prevent the device portion from being dislodged from (or knocked off of) the wristband.

Figure 3:
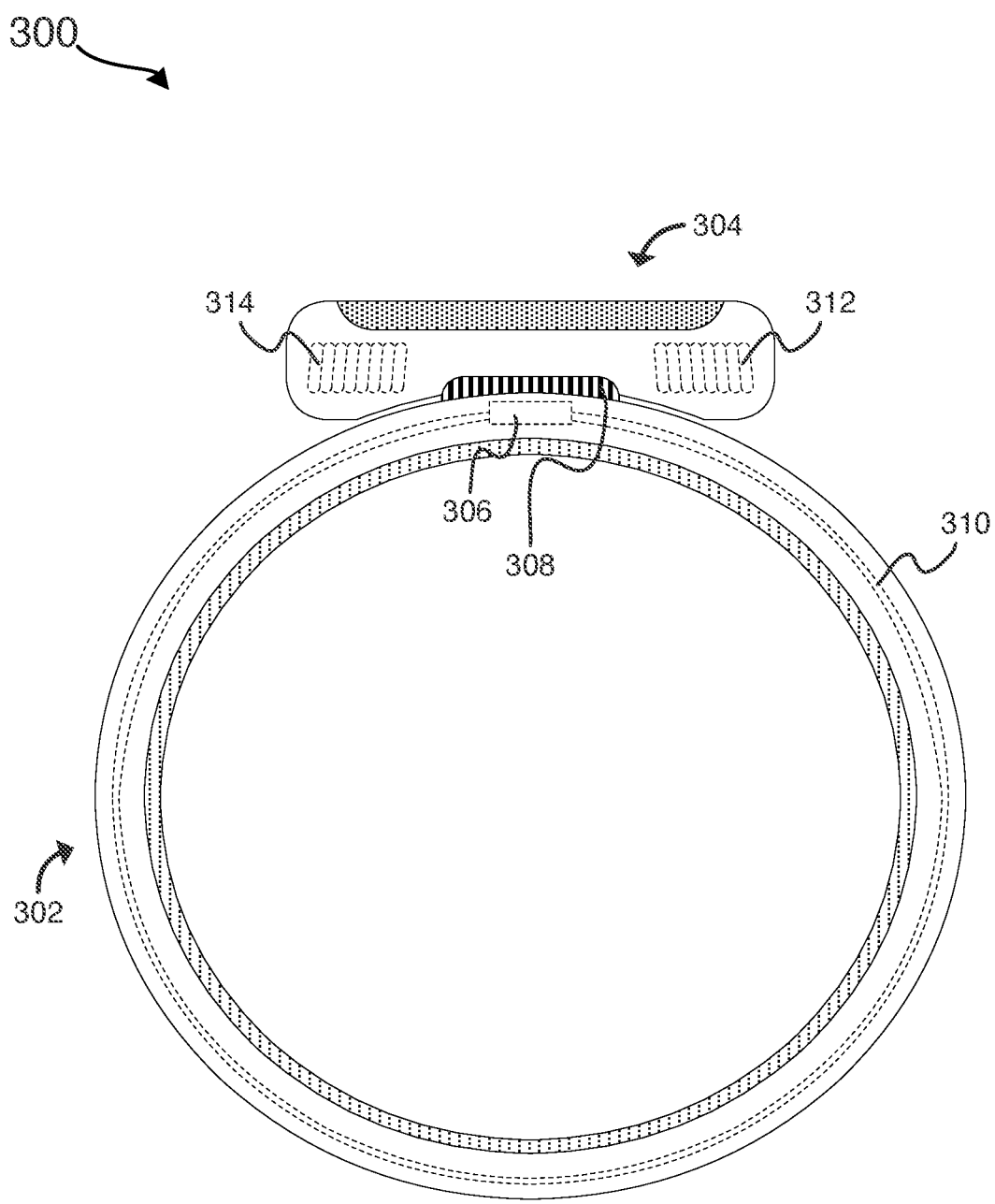
FIG. 3 depicts a wrist-worn device with a set of electromagnets that may be used to cause a display portion to orbit around a wristband.

FIG. 3 illustrates an example embodiment in which a wrist-worn device 300 includes a wristband 302 with a single location that may provide an attachment that does not rely on a battery and that is strong enough to prevent a display portion 304 from being dislodged by moderate contact. Wrist-worn device 300 includes wristband connection component 306 and display connection component 308. At least one of wristband connection component 306 and display connection component 308 may be a permanent magnetic material, such as a rare-earth magnet. The other connection component may either be a second permanent magnet or a magnetic material, such as steel. The resulting magnetic attraction between wristband connection component 306 and display connection component 308 may therefore not rely on a battery, and thus may be present even after all batteries within wrist-worn device 300 are completely drained. Further, in some embodiments the magnetic connection between wristband connection component 306 and display connection component 308 may be strong enough to prevent display portion 304 and wristband 302 from separating in the absence of significant force (for example, when the user intentionally pulls the display portion 304 off of wristband 302).

For example, in some embodiments wristband connection component 306 may be a permanent magnet and display connection component 308 may be a set of steel bushings that are attracted to wristband connection component 306 and also reduce the force required to cause display portion 304 to orbit around wristband 302.

Wrist-worn device 300 also includes orbit track 310. Orbit track 310 may create a magnetic field that spans the circular length of wristband 302 and that may be used to cause display portion 304 to orbit wristband 302. For example, orbit track 310 may take the form of a wire of magnetic material (e.g., copper) that may be a flat wire (e.g., strip-wire), circular wire, or coiled into a thin solenoid. In some embodiments, magnetic field provided by orbit track 310 may originate from an electrical current provided by a battery that may be within wristband 302 or display portion 304. In other embodiments, the magnetic field provided by orbit track 310 may originate from a natural magnet. This may be particularly advantageous in embodiments in which wristband connection component 306 is itself a permanent magnet. In these embodiments, wristband 302 may not rely on battery power to enable display portion 304 to orbit.

In some embodiments, orbit track 310 may be designed to be thin, thus providing flexibility to wristband 302. However, this thin design may reduce the magnetic field produced by orbit track 310. In these embodiments, the magnetic field produced by orbit track 310 may attract display connection component 308 with enough force to prevent display portion 304 from separating from wristband 302 due to the weight of display portion 304. In other words, orbit track 310 may prevent display portion 304 from simply falling off solely due to the acceleration of gravity. However, the thin design of orbit track 310 may not allow for a strong enough attraction to prevent display portion 304 from being knocked off wristband 302.

For these reasons, wrist-worn device 300 may be configured to remain in the configuration shown in FIG. 3 whenever the device is not being used. For example, in some embodiments display portion 304 may remain in close proximity to wristband connection component 306 when the user is not looking at display portion 304 or interacting with buttons or a touchscreen on display portion 304. This may reduce the likelihood that display portion 304 is unintentionally dislodged.

However, when wrist-worn device 300 determines that display portion 304 should orbit around wristband 302, wrist-worn device 300 may activate one of electromagnets 312 and 314. Electromagnets 312 and 314 may take the form of solenoids (i.e., coils of magnetic metal wire) that may be connected to a battery within display portion 304. Each of electromagnets 312 and 314 may be separated from the battery with a switch that can be used to cause current to flow through the corresponding electromagnet or prevent current from flowing through the corresponding electromagnet.

For example a switch near electromagnet 314 may, when closed, cause current to flow from a battery within display portion 304 through electromagnet 314. This flowing current may create a magnetic field that surrounds electromagnet 314 and that may interact with the magnetic field created by orbit track 310. This interaction may produce a magnetic force upon electromagnet 314 that is transferred to display portion 304. This magnetic force may cause display portion 304 to orbit around wristband 302 in, for example, a counterclockwise direction (as illustrated).

In this example, electromagnet 314 may take the form of a solenoid with wires that, because of the direction in which they coil, cause electrical current to flow through the solenoid in a pattern that then causes a magnetic flux in a particular direction (e.g., towards electromagnet 312). Further, electromagnet 312 may also take the form of a solenoid, but electrical current may flow through the solenoid in an opposite pattern, causing the magnetic flux produced by electromagnet 312 to flow in the opposite direction that the magnetic flux produced by electromagnet 314 produces. In other words, electromagnet 312 and electromagnet 314 may be used to orbit wristband 302 in opposite directions.

For example, electromagnet 312 may be powered by wrist-worn device 300 to cause display portion 304 to orbit clockwise, whereas electromagnet 314 may be powered by wrist-worn device 300 to cause display portion to orbit counterclockwise.

However, in some embodiments it may be detrimental for wrist-worn device 300's battery to become completely depleted while display portion 304 is orbited away from wristband connection component 306 (i.e., away from the position in which display portion 304 may be permanently and securely attracted to wristband 302). Because electromagnets 312 and 314 may rely on a battery to orbit display portion 304, if the batteries in wrist-worn device 300 are completely depleted, wrist-worn device may be unable to orbit display portion 304 back to this secure position. Thus, display portion 304 may be prone to being dislodged until the batteries are recharged. Further, in embodiments in which orbit track 310 also relies on a battery to create a magnetic field, display portion 304 may no longer be attracted to wristband 302 when this battery dies, and display portion 304 may simply fall off at that point.

Therefore, in some embodiments, wrist-worn device 300 may be configured to maintain display portion 304 in a position that is proximate to wristband connection component 306 (i.e., the configuration illustrated in FIG. 3) when one or more batteries of the wrist-worn device drops below a threshold (e.g., 10%). Once in that position, wrist-worn device 300 may not cause display portion 304 to orbit again until the wrist-worn device 300's battery capacity is once again above the threshold. This may be useful to prevent display portion 304 from becoming stuck in a location at which the display portion 304 may be easily dislodged or may simply fall off when wrist-worn device 300 runs out of battery.

In FIG. 3, wristband connection component 306, orbit track 310, and electromagnets 312 and 316 are illustrated with dotted lines to indicate that they are located within the housing of wrist-worn device 100. In some embodiments, display connection component 308 may also be located within the housing of wrist-worn device 100 (e.g., within the housing of display portion 304).

Wrist-worn device 300 is illustrated with two separate electromagnets 312 and 314. While there may be practical advantages for this in some instances, in some use cases it may also be beneficial to utilize only one electromagnet for orbiting around wristband portion 302. For example, in some embodiments one of electromagnets 312 and 314 may not be included, and the remaining electromagnet may be centrally located within display portion 304. In these embodiments, display portion 304 may still be capable of orbiting in two directions by reversing the direction of current flow through the remaining electromagnet. Reversing the current flow may also reverse the direction of the magnetic flux created by the electromagnet, potentially causing display portion 304 to orbit in a reverse direction as well.

In FIG. 3, wrist-worn device 300 is illustrated as having one position of permanent attachment. However, in some embodiments a wrist-worn device may have multiple discrete locations of permanent attachment. For example, a wrist worn device may have four positions of permanent attachment, one located at every 90 degrees. Similarly, in some embodiments the permanent attachment of display portion 304 to wristband 302 may not be created by means of magnetic force, but may be a localized mechanical contraption. For example, in some embodiments the permanent attachment may be accomplished by inserting the display portion into a clip or socket that may physically hold the display portion until the user removes the display portion from the clip/socket. In this embodiment, the wrist-worn device may notify the user when the battery charge level is below a threshold, giving the user the opportunity to secure the device portion in the clip before the battery completely dies.

Figure 4:
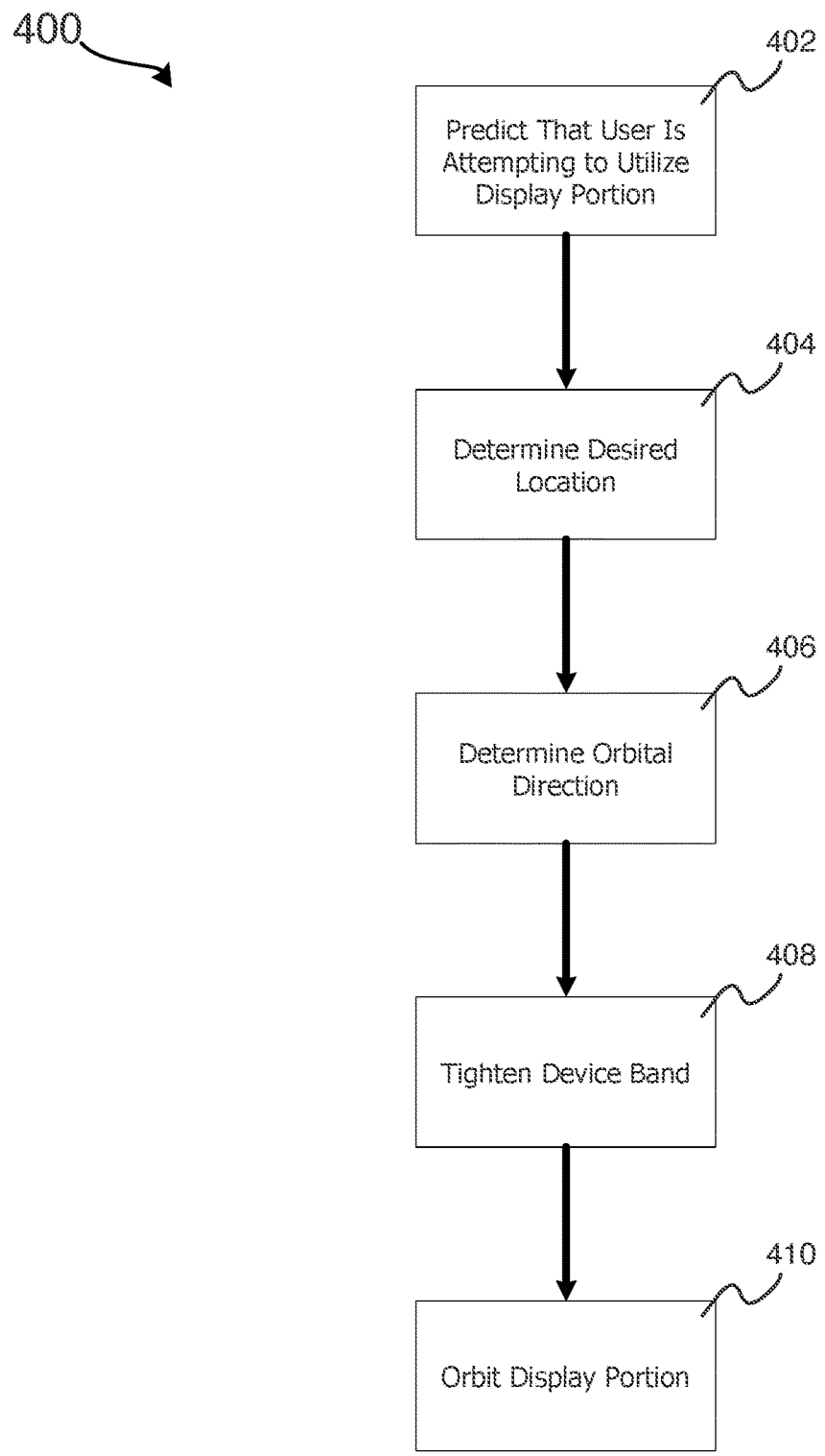
FIG. 4 depicts an example method of orbiting a display portion of a user-worn device around a wristband.

FIG. 4 illustrates a method 400 by which a display portion of a user-worn device may be orbited around a device band to a desired location. In some embodiments, method 400 may be performed by a user-worn device, such as wrist-worn devices of FIGS. 1-3. In some embodiments, the user-worn device may include a computer system similar to the computer system of FIG. 8, and may utilize a machine-learning system such as neural network 700 to perform predictions.

Method 400 begins in block 402 in which the user-worn device predicts that a user is attempting to utilize a display portion of a user-worn device. For example, the user-worn device may detect movement of the user-worn device that is indicative of a user raising his or her arm in front of his or her face. This detection may occur using, for example, one or more accelerometers and one or more gyroscopes located within the user-worn device.

Upon detecting that movement, the user-worn device may predict that the user is attempting to view the display portion of the user-worn device. In some embodiments, this prediction may also include making associations between current user data and historical data. This historical data may either be data of the user's prior uses of the device or historical data of several other users. For example, a trained neural network may be capable of ingesting data related to the user's movement patterns, biometric measurements, and even data relating to the visual gaze of the user. The trained neural network may be capable of identifying patterns in that ingested data, and compare the patterns to patterns recognized in historical data that were (or were not) associated with an prior user's attempt to utilize a portion of the display. But performing this analysis using a classifier network, for example, the user-worn device may be able to output a prediction (e.g., 73%) of whether the user's current usage data is likely to be associated with an attempt to utilize the display portion of the user-worn device.

Once a prediction is made in block 402, the user-worn device determines, in block 404, the desired location to which to orbit the display portion. This precise location may vary from instance to instance because different uses of a user-worn device in different situations may benefit from different locations of the display portion. For example, if a user is attempting to view a notification on a smart watch while walking, the natural position for viewing the smart watch may place the display portion directly on top of the user's wrist (i.e., near the user's forehand). However, if the same user is attempting to view a notification on the smart watch while driving, the natural position for viewing the smart watch may place the display portion on the side of the viewers wrist (i.e., near the user's thumb). However, if the same user is attempting to interact with buttons on the touchscreen of the smart watch, the natural position for interacting with the smart watch may place the display portion on the underside of the user's wrist (i.e., near the user's palm).

Determining the desired location to orbit a display portion of a user-worn device may take several factors into account. Some of these factors may be similar to or the same as the factors that were used to predict that the user is attempting to utilize the display portion in block 402. For example, in some embodiments one or more accelerometers, gyroscopes, or other movement sensors in a wrist-worn device may track the movement and rotation of the device and predict the final location of the device based on that movement and rotation. Based on that movement and rotation, location on the device band that is likely to be between the user's wrist and the user's eyes may be chosen. In some embodiments, one or more cameras on the wrist-worn device may also track the location of the user's face in relation to the wrist-worn device, including the direction of the user's gaze.

In some embodiments, these and other sensors may attempt to take the user's situation into account as well. For example, a user who is driving a vehicle may have less capability to rotate/move his or her wrist than a user who is standing still. Similarly, a user who is running may view a user-worn device differently than a user who is walking.

In some embodiments, the user-worn device may also take into account other information available to it, such as the type of notification to which the user may be responding. For example, in some embodiments the user may view a notification with fine text differently than a notification with solely a large picture (for example, the user may hold the user-worn device close to the user's face to read fine text, but may simply glance at a large-picture notification without moving his/her arm). In some embodiments, the user-worn device may have access to the user's calendar, and realize, for example, that the user is in a meeting and thus may not wish to move or rotate his/her arm. In this example, the user-worn device may determine the desired location based on the user's arm location/rotation at the time the notification occurs.

Further, some instances may require that the desired location be chosen with more precision than others. In some instances, the desired location may be a large range (e.g., anywhere on the upper-right quarter of the band) whereas it may be a small range in other instances (e.g., 90 degrees clockwise of the current position). For example, some users may view calendar reminders very carefully, and thus the desired location for the display portion may be quite important to those users when a calendar reminder arrives. Thus, for those users, the desired location for viewing a calendar reminder may be very precise (e.g., within a few degrees or a particular point on the band). However, those same users may typically only glance at a social-media notification once they realize the purpose of the notification, and therefore the desired location for the display portion may less important when a social-media notification arrives. Thus, for those users, the desired location for viewing a social-media notification may not be precise (e.g., within 45 degrees of a particular point on the band).

Finally, in some embodiments a user-worn device may utilize a machine-learning system to determine the desired location for a particular situation. This machine-learning system may either be found on the user-worn device or another device to which the user-worn device is connected (e.g., a user's smartphone or a remote server). For example, a machine-learning system may analyze historical data that includes data related to arm movement/rotation, other user movement, the user's situation, reason for viewing/interacting with a display portion, and others. That historical data may be include data for a group of users or may solely include data related to the current user. The machine-learning system may identify patterns in the historical data that are associated with the desired location to utilize a display portion. The machine-learning system may then attempt to identify those (or other) patterns in the user's user of the user-worn device to determine the desired location to utilize a display portion in a particular instance.

Once the desired location to which to orbit the display portion has been determined, the user-worn device may also determine, in block 406, the orbital direction in which to orbit the display portion of the user-worn device. In some embodiments, this may attempt to minimize the battery power utilized to orbit the display portion. For example, in some embodiments it may be far more efficient to orbit the display device 45 degrees counterclockwise rather than 315 degrees clockwise. In some embodiments, this determination may be based solely on the display portion's current position and the desired location that was determined in block 404. However, in other embodiments the current and predicted movement/rotation of the user-worn device may also be taken into account. For example, if the user is moving his/her arm in a particular direction or rotating his/her arm in a particular angular direction, the user-worn device may require less battery power to orbit the device 160 degrees with that movement or rotation than to orbit the device 200 degrees against that movement or against that rotation. In some instances, the user-worn device may take advantage of the momentum of the user movement/rotation and orbit with the user movement/rotation, whereas in other instances, the user-worn device may take advantage of the display-portion's inertia and orbit the device against the user movement/rotation.

In some embodiments of the present disclosure, orbiting a display portion to a position on a band may also include tightening the band. This may be beneficial in use cases in which the user is wearing the band loosely enough that the band can rotate on the user's arm or wrist (for example, the user may be wearing a smart watch very loosely to prevent skin irritation). In these use cases, the device may rotate on the user's arm or wrist, for example, when the user is moving his or her arm or wrist to view a notification or when the display portion orbits around the device band, affecting the band's angular momentum.

For this reason, method 400 also includes tightening the band in block 408. While block 408 is illustrated in FIG. 4 as occurring after the orbital direction is determined, in some embodiments the location of block 408 may be earlier in method 400. In some embodiments of method 400, the band may be tightened at any time after block 402 and before block 410.

After the band is tightened in block 408 and the orbital direction is determined in block 406, the user-worn device orbits the display portion in block 410 to the location determined in block 404 and in the orbital direction determined in block 406. In some embodiments, the user-worn device may also determine when the user is finished utilizing the display portion and may then return the display portion to a point of permanent (or semi-permanent) attachment. In other embodiments, the display portion may remain in the location that was determined in block 404 until the user-worn device again predicts that the user is attempting to utilize the display portion in a future iteration of block 402, at which point the user-worn device may repeat method 400.

In some use cases, a user may need to interact with a user-worn device (or the user-worn device may interact with the user) without specifically interacting with a display portion of the user-worn device. For example, some user-worn devices may not have a specific display portion, but may be used, for example, for recording user biometric information. Other devices may have a specific display portion, but may be capable of recording biometric information without the user interacting with the display portion. Users of these user-worn devices may wear the devices loosely during regular use, as previously discussed. However, these user-worn devices may not be able to accurately record biometric information when the band is not tight against the user's skin. Thus, in some embodiments of the present disclosure, a user-worn device may attempt to predict when the user desires to use the device to record biometric information and tighten a band accordingly.

Figure 5:
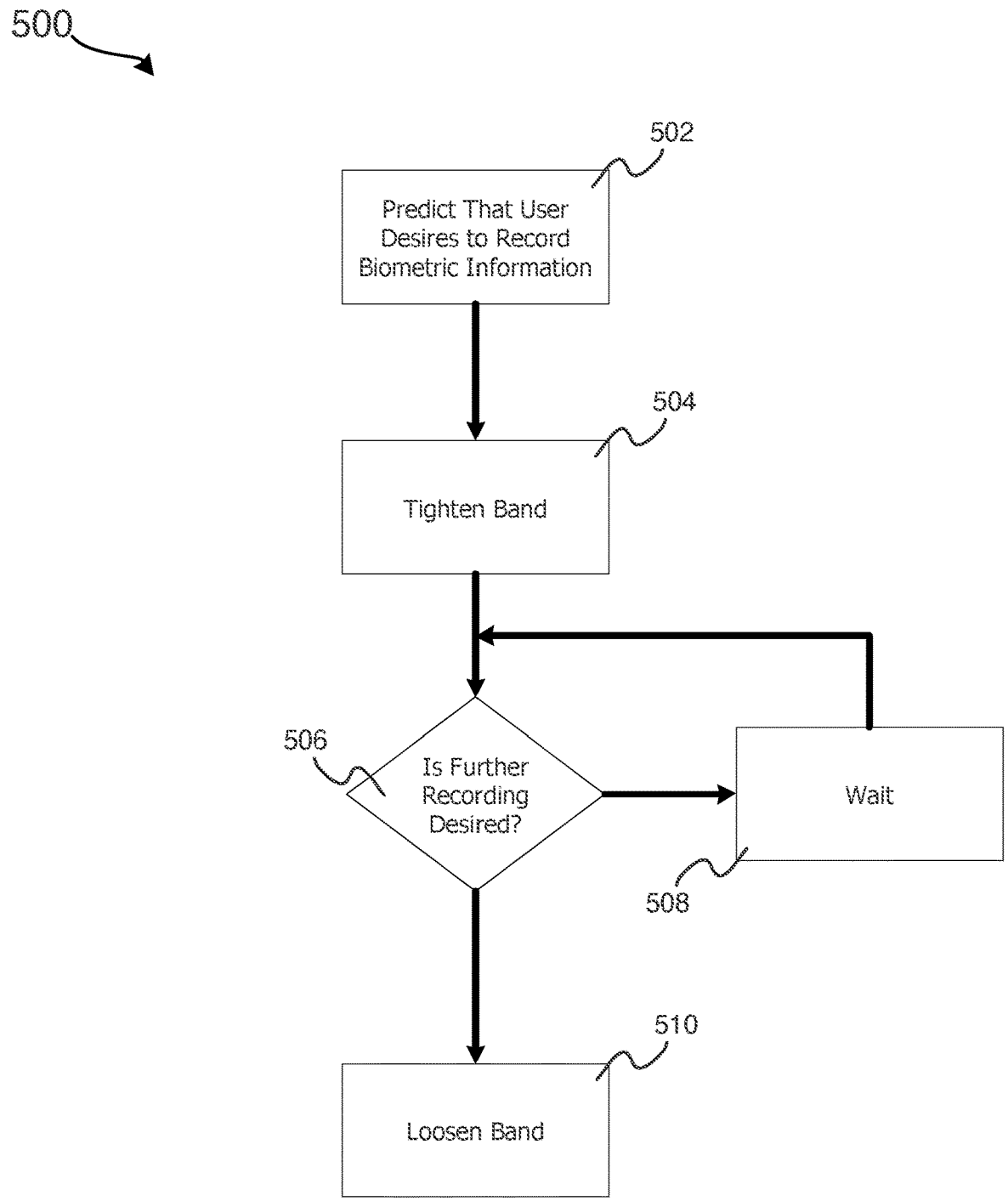
FIG. 5 depicts an example method of tightening a device band for recording biometric information.

FIG. 5 illustrates a method 500 by which a user-worn device may predict that a user may wish to record biometric information with the user-worn device and tighten the device's band to allow accurate biometric measurements to be recorded. Method 500 begins in block 502, in which the user-worn device predicts that the user wishes to record biometric information. Examples of recording biometric information may include skin temperature, blood pressure, blood-oxygen content, heartrate, skin moisture content, and others. The prediction in block 502 may utilize any information that is available to the user-worn device and consistent with the embodiments of this disclosure. For example, block 502 may include any or all of the factors considered in blocks 402 through 406 of method 400.

When the user-worn device predicts that the user desires to record biometric information, the user-worn device tightens a band of the user-worn device in block 504. The tightening may occur, for example, by inflating the inner portion of the band causing the inflated portions to squeeze the user. The tightening could also occur by cinching the band closed, or by tightening smaller connective bands that attach to multiple points on the inside of the overall band. Once the band is tightened, the user-worn device (or the user) may commence recording biometric information.

In block 506, the user-worn device determines whether further biometric recording is desired. In some embodiments, for example, block 506 may include the user-worn device determining whether the factors that caused the user-worn device to determine in block 502 that recording was desired are still relevant. For example, if the user-worn device determined in block 502 that the user started jogging, and thus would desire heart-rate monitoring, block 506 may determine whether the user has finished jogging. In some embodiments, block 506 may also determine whether the prediction in block 502 was incorrect. For example, if the user-worn device determined in block 502 that the user was hiking up an incline, the user-worn device may have predicted that the user would want blood oxygen content recorded. However, it may become clear in block 506 that the user is not likely hiking, but may be on an escalator or elevator.

If the user-worn device determines that further recording is desired, the user-worn device waits a predetermined amount of time in block 508 (e.g., one millisecond, one minute) and then repeat block 506. If, however, the user-worn device determines that further recording is not desired, the user-worn device loosen, in block 510, the band back to its state prior to block 504, and method 500 may end.

In some embodiments of the present disclosure, a wrist-worn device may feature a display portion composed of two display subsections that may each orbit relatively independently. For example, each display subsection may include one or more electromagnets that may interact with a magnetic field present in the wrist-worn device, causing the corresponding display subsection to orbit around a wristband. In some such embodiments, a rollable display may appear between the two device subsections when they separate, effectively increasing the overall size of the display on the display portion. This may be useful, for example, in reducing the distance one of the two display subsections needs to orbit, or in reducing the precision of the location to which the device portion needs to orbit. In either case, the user-worn device may reduce the battery power required to orbit the device portion as a result.

Figure 6A:
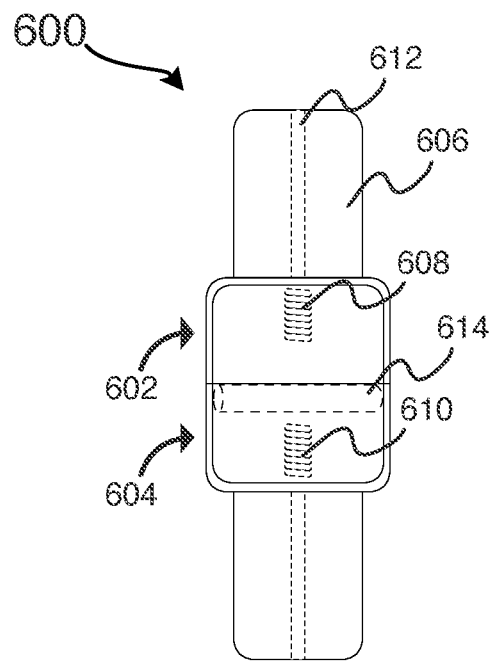
FIG. 6A depicts a wrist-worn device with an extendable display in a retracted configuration.
Figure 6B:
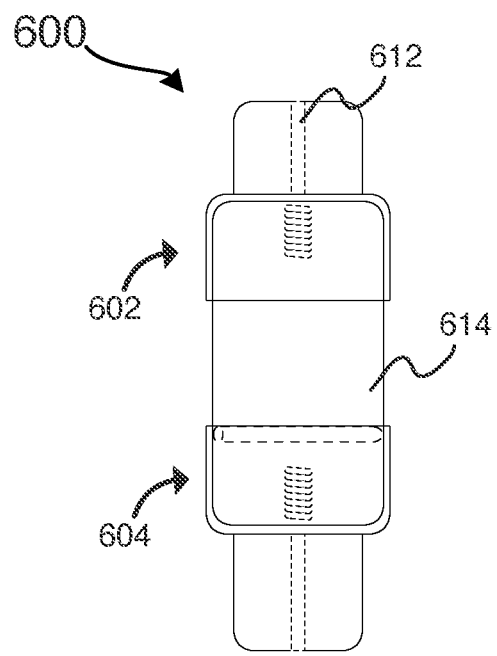
FIG. 6B depicts a wrist-worn device with an extendable display in an extended configuration.

FIGS. 6A and 6B illustrate wrist-worn device 600, which includes a display portion with two separate display subsections 602 and 604 and wristband 606. In FIG. 6A, display subsections 602 and 604 are located adjacent to each other such that they effectively form one continuous display section. Each of display sections 602 and 604 contain electromagnets 608 and 610, which may take the form of solenoids. Electromagnets 608 and 610 may be responsible for causing display subsections 602 and 604 to orbit around wristband 606. In some embodiments, electromagnets 606 and 608 may each represent two or more electromagnets that to cause display subsections 602 and 604 to orbit in a particular direction. For example, electromagnet 608 may actually be two solenoids with opposite coil direction. Powering the first solenoid may cause a magnetic flux in the direction of the top of the figure, and powering the second solenoid may cause a magnetic flux in the direction of the bottom of the figure. In other embodiments, electromagnets 606 and 608 may represent a single electromagnet. For example electromagnet 606 may be a single solenoid that, through one or more switches, could be powered from one direction to cause a magnetic flux in the direction of the top of the figure and from another direction to cause a magnetic flux in the direction of the bottom of the figure.

The magnetic fields created by electromagnets 608 and 610 may interact with a magnetic field created by orbit track 612. Orbit track 612 may take the form of a metal wire (including, potentially, a metal strip or thin metal coil) that creates a magnetic field surrounding wristband 606.

Wrist-worn device 600 also includes rollable display 614 that, when display subsections 602 and 604 are adjacent to each other (as illustrated in FIG. 6A), is retracted and spooled around a cylinder inside display subsection 604. One end of rollable display 614 may be attached to the cylinder, while the other end of rollable display 614 may be attached in or on display subsection 602.

In FIG. 6B, display subsections 602 and 604 have orbited away from each other along orbit track 612. As a result, display subsections 602 and 604 no longer effectively form one continuous display section by themselves. However, as display subsections 604 and 604 have separated, rollable display 614 has retracted into the empty space formed between them. In this way, display subsections 602 and 604 may effectively form one continuous display section together with rollable display 614.

In some embodiments, rollable display 614 could be utilized to save battery power that is used to orbit display subsections 602 and 604. For example, by increasing the total size of the effective display, notifications displayed to a user could be larger. This may increase the ability of a user to view a notification at a greater distance or a less convenient viewing angle, and may therefore reduce the necessity to orbit the display subsections 602 and 604 (and rollable display 614) to a precise location. Further, in some embodiments a user may need to view a notification on part of the display, but the notification may be small enough to occupy only one display subsection (e.g., display subsection 602) or one display subsection and a portion of rollable display 614. In those embodiments, it may be possible to reduce the amount that one of the display subjections (e.g., display subsection 604) is required to orbit, because the user would not need to be able to view that display subsection. For example, display subsection 602 could orbit sufficiently far to bring itself and half of rollable display 614 into view, but display subsection 604 could stop orbiting before it came into the user's line of sight. This would save the battery power that would otherwise have been required to orbit the mass of display subsection 604 into the user's line of sight.

As has been discussed previously, a machine-learning system such as a neural network may process and analyze input data (here, a combination of data from, where available, device sensors, user biometrics, notification data, device data, and other usage data) by recognizing patterns in the input data and comparing those patterns to patterns related to historical user-worn device usage on which the neural network has been trained. For example, a neural network may recognize several patterns in the data expressed by an input vector for a particular wrist or arm motion. The neural network may then associate some of those patterns with the patterns associated with historical wrist (or arm) motions that the neural network has been trained (e.g., by human-supervised training or automatic training) to predict whether the user desires to interact with the display or whether the user desires to record biometric information.

In some embodiments, data input into a neural network may take the form of a vector. A vector may be a one-dimension matrix (e.g., a matrix with one row and many columns) of numbers, each of which expresses data related to, for example, user-worn device motion and rotation. A vector may also be referred to herein as an "input vector," a "feature vector," or a "multi-dimension vector." For example, as previously discussed, this vector may include movement and rotation data, location of the user's face, direction of the user's gaze, notification data, reason for viewing/interacting with a display portion, and others.

Figure 7:
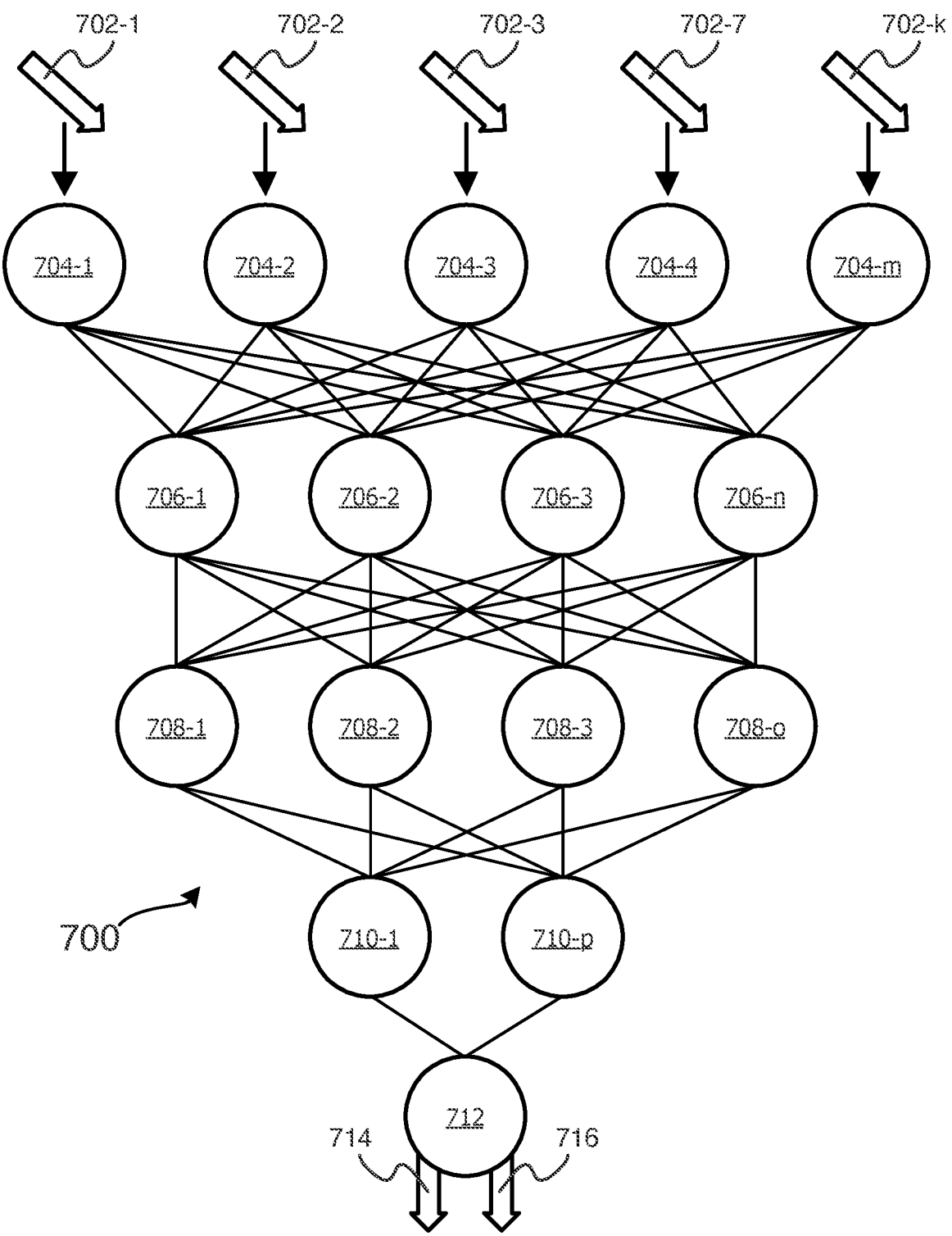
FIG. 7 illustrates the representative major components of a neural network that may be used in accordance with embodiments.

Such a neural network is illustrated in FIG. 7. In FIG. 7, neural network 700 may be trained to predict the likelihood that a user is attempting to utilize a display portion, the desired location to which a display portion should orbit, or whether a user desires to record biometric information. The inputs of neural network 700 are represented by feature vectors 702-1 through 702-$k$. These feature vectors may contain all information that is available to the user-worn device or a subset of that information. In some embodiments, feature vectors 702-1 through 702-$k$ may be identical copies of each other. In some embodiments, more of instances of feature vectors 702 may be utilized. The number of feature vectors 702-1 through 702-$k$ may correspond to the number of neurons in feature layer 704. In other words, in some embodiments, the number of inputs 702-1 through 702-$k$ (i.e., the number represented by m) may equal (and thus be determined by) the number of first-layer neurons in the network. In other embodiments, neural network 700 may incorporate 1 or more bias neurons in the first layer, in which case the number of inputs 702-1 through 702-$k$ may equal the number of first-layer neurons in the network minus the number of first-layer bias neurons.

Feature layer 704 contains neurons 701-1 through 701-$m$. Neurons 704-1 through 704-$m$ accept as inputs feature vectors 702-1 through 702-$k$ and process the information therein. Once vectors 702-1 through 702-$k$ are processed, neurons 704-1 through 704-$m$ provide the resulting values to the neurons in hidden layer 706. These neurons, 706-1 through 706-$n$, further process the information, and pass the resulting values to the neurons in hidden layer 708. Similarly, neurons 708-1 through 708-$o$ further process the information and pass it to neurons 710-1 through 710-$p$. Neurons 710-1 thorough 710-$p$ process the data and deliver it to the output layer of the neural network, which, as illustrated, contains neuron 712. Neuron 712 may be trained to calculate two values-value 714 and value 716. Value 714 may represent, for example, the likelihood that a user is attempting to utilize a display portion. Value 716, on the other hand, may represent the likelihood that a user is not attempting to utilize a display portion.

In some embodiments, neural network 700 may have more than 5 layers of neurons (as presented) or fewer than 5 layers. These 5 layers may each comprise the same amount of neurons as any other layer, more neurons than any other layer, fewer neurons than any other layer, or more neurons than some layers and fewer neurons than other layers. Finally, in some embodiments, the output of output layer 712 may be used to determine, for example, whether to orbit a display portion along an orbit track, the location to which to orbit a display portion, or whether to tighten a device band.

Figure 8:
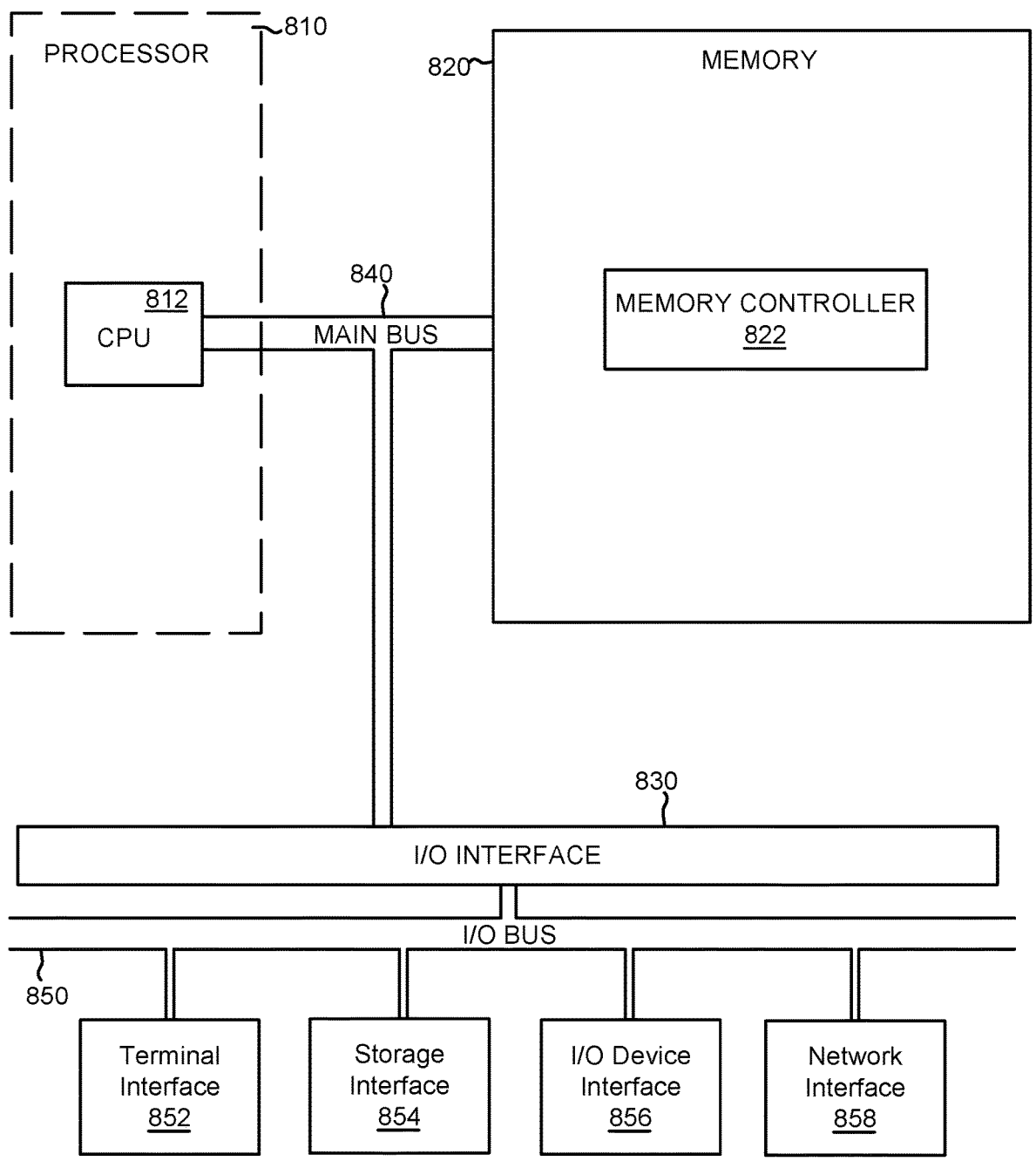
FIG. 8 depicts the representative major components of a computer system that may be used in accordance with embodiments.

FIG. 8 depicts the representative major components of an example Computer System 801 that may be used in accordance with embodiments of the present disclosure. The particular components depicted are presented for the purpose of example only and are not necessarily the only such variations. The Computer System 801 may include a Processor 810, Memory 820, an Input/Output Interface (also referred to herein as I/O or I/O Interface) 830, and a Main Bus 840. The Main Bus 840 may provide communication pathways for the other components of the Computer System 801. In some embodiments, the Main Bus 840 may connect to other components such as a specialized digital signal processor (not depicted).

The Processor 810 of the Computer System 801 may include one or more CPUs 812. The Processor 810 may additionally include one or more memory buffers or caches (not depicted) that provide temporary storage of instructions and data for the CPU 812. The CPU 812 may perform instructions on input provided from the caches or from the Memory 820 and output the result to caches or the Memory 820. The CPU 812 may include one or more circuits configured to perform one or methods consistent with embodiments of the present disclosure. In some embodiments, the Computer System 801 may contain multiple Processors 810 typical of a relatively large system. In other embodiments, however, the Computer System 801 may be a single processor with a singular CPU 812.

The Memory 820 of the Computer System 801 may include a Memory Controller 822 and one or more memory modules for temporarily or permanently storing data (not depicted). In some embodiments, the Memory 820 may include a random-access semiconductor memory, storage device, or storage medium (either volatile or non-volatile) for storing data and programs. The Memory Controller 822 may communicate with the Processor 810, facilitating storage and retrieval of information in the memory modules. The Memory Controller 822 may communicate with the I/O Interface 830, facilitating storage and retrieval of input or output in the memory modules. In some embodiments, the memory modules may be dual in-line memory modules.

The I/O Interface 830 may include an I/O Bus 850, a Terminal Interface 852, a Storage Interface 854, an I/O Device Interface 856, and a Network Interface 858. The I/O Interface 830 may connect the Main Bus 840 to the I/O Bus 850. The I/O Interface 830 may direct instructions and data from the Processor 810 and Memory 820 to the various interfaces of the I/O Bus 850. The I/O Interface 830 may also direct instructions and data from the various interfaces of the I/O Bus 850 to the Processor 810 and Memory 820. The various interfaces may include the Terminal Interface 852, the Storage Interface 854, the I/O Device Interface 856, and the Network Interface 858. In some embodiments, the various interfaces may include a subset of the aforementioned interfaces (e.g., an embedded computer system in an industrial application may not include the Terminal Interface 852 and the Storage Interface 854).

Logic modules throughout the Computer System 801—including but not limited to the Memory 820, the Processor 810, and the I/O Interface 830—may communicate failures and changes to one or more components to a hypervisor or operating system (not depicted). The hypervisor or the operating system may allocate the various resources available in the Computer System 801 and track the location of data in Memory 820 and of processes assigned to various CPUs 812. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A user-worn device comprising
a band portion that comprises a wire, wherein the wire is configured to create a first magnetic field that follows a curvature of the band portion; and
a display portion that comprises a first electromagnet, wherein the first electromagnet is configured to produce a second magnetic field;
wherein the display portion orbits around the band portion in a first orbital direction when the first and second magnetic fields interact and wherein the display portion displays data and comprises a housing.

2. The user-worn device of claim 1, wherein the display portion comprises a second electromagnet, wherein the second electromagnetic is configured to produce a third magnetic field, and wherein the display portion orbits around the band portion in a second orbital direction when the first and third magnetic fields interact.

3. The user-worn device of claim 1, wherein the first electromagnet is configured to produce a third magnetic field when a current flowing through the first electromagnet is reversed, and wherein the display portion orbits around the band portion in a second orbital direction when the first and fourth magnetic fields interact.

4. The user-worn device of claim 1, wherein the wire is embedded in the band portion.

5. The user-worn device of claim 4, wherein the wire is coiled into a solenoid that spans a length of the band portion.

6. The user-worn device of claim 4, wherein the band portion comprises a permanent magnet.

7. The user-worn device of claim 6, wherein the permanent magnet is connected to the wire.

8. The user-worn device of claim 1, wherein the display portion comprises two device subsections, and wherein the two device subsections are capable of orbiting independently.

9. The user-worn device of claim 1, wherein the user-worn device is a smartwatch.

10. A method of using a user-worn device, the method comprising:
monitoring usage data of a user-worn device;
predicting, based on the monitoring, that a user of the user-worn device is attempting to utilize a display portion of the user-worn device;
determining, based on the monitoring and the predicting, a desired location of the display portion;
determining, based on the monitoring and the desired location, an efficient orbital direction;
tightening a device band of the user-worn device; and
orbiting the display portion to the desired location in the orbital direction; wherein the display portion comprises a housing.

11. The method of claim 10, wherein the orbiting comprises powering a first electromagnet in a first current direction, wherein the first electromagnet is embedded within the display portion.

12. The method of claim 10, further comprising returning, after the orbiting, the display portion to a location at which the display portion was located prior to the orbiting.

13. The method of claim 12, wherein the returning comprises powering a first electromagnet embedded within the display portion.

14. The method of claim 12, wherein the orbiting comprises powering a first electromagnet in a first current direction and wherein the returning comprises powering the first electromagnet in a second current direction, wherein the second current direction is opposite the first current direction.

15. A computer program product, the computer program product comprising a computer readable storage medium having program instructions embodied therewith, the program instructions executable by a computer to cause the computer to:
   monitor usage data of a user-worn device;
   predict, based on the monitoring, that a user of the user-worn device is attempting to utilize a display portion of the user-worn device;
   determine, based on the monitoring and the predicting, a desired location of the display portion;
   determine, based on the monitoring and the desired location, an efficient orbital direction;
   tighten a device band of the user-worn device; and
   orbit the display portion to the desired location in the orbital direction; wherein the display portion comprises a housing.

16. The computer program product of claim 15, wherein the orbiting comprises powering a first electromagnet in a first current direction, wherein the first electromagnet is embedded within the display portion.

17. The computer program product of claim 15, wherein the program instructions are further executable by a computer to cause the computer to return, after the orbiting, the display portion to a location at which the display portion was located prior to the orbiting.

18. The computer program product of claim 17, wherein the returning comprises powering a first electromagnet embedded within the display portion.

19. The computer program product of claim 17, wherein the orbiting comprises powering a first electromagnet in a first current direction and wherein the returning comprises powering the first electromagnet in a second current direction, wherein the second current direction is opposite the first current direction.

* * * * *